(12) United States Patent
Weinbrenner et al.

(10) Patent No.: US 8,028,738 B2
(45) Date of Patent: Oct. 4, 2011

(54) SIDE PANEL WITH INTEGRATED WINDOW SHADE GUIDE RAIL

(75) Inventors: Harry Weinbrenner, Ostfildern (DE); Olaf Buhl, Albershausen (DE)

(73) Assignee: BOS GmbH & Co. KG, Ostfildern (DE)

( * ) Notice: Subject to any disclaimer, the term of this patent is extended or adjusted under 35 U.S.C. 154(b) by 201 days.

(21) Appl. No.: 10/965,430

(22) Filed: Oct. 14, 2004

(65) Prior Publication Data

US 2005/0092449 A1    May 5, 2005

(30) Foreign Application Priority Data

Oct. 31, 2003    (DE) .................................. 103 51 040

(51) Int. Cl.
*B60J 3/00*    (2006.01)
(52) U.S. Cl. .................................. 160/370.22
(58) Field of Classification Search .......... 160/309, 160/311, 370.21, 370.22, 274, 273.1, 270, 160/272, 267.1; 296/97.8, 138, 141, 143
See application file for complete search history.

(56) References Cited

U.S. PATENT DOCUMENTS

| | | | | |
|---|---|---|---|---|
| 4,357,978 A | * | 11/1982 | Keller et al. | 160/41 |
| 4,758,041 A | * | 7/1988 | Labeur | 296/152 |
| 5,117,892 A | * | 6/1992 | Murray | 160/273.1 |
| 5,482,104 A | * | 1/1996 | Lichy | 160/273.1 |
| 5,601,134 A | * | 2/1997 | Pinkalla et al. | 160/271 |
| 6,968,887 B2 | * | 11/2005 | Hansen et al. | 160/370.22 |
| 7,014,243 B2 | * | 3/2006 | Nakajo | 296/97.4 |
| 7,188,659 B2 | * | 3/2007 | Hansen et al. | 160/370.22 |
| 2002/0059989 A1 | | 5/2002 | Schlecht et al. | |
| 2003/0205341 A1 | * | 11/2003 | Simon et al. | 160/267.1 |
| 2004/0069425 A1 | * | 4/2004 | Hansen et al. | 160/370.22 |

FOREIGN PATENT DOCUMENTS

| | | |
|---|---|---|
| DE | 3822378 A1 | 1/1990 |
| DE | 9010440 U | 9/1990 |
| DE | 9303987 U | 8/1993 |
| DE | 100 57 759 A1 | 6/2002 |
| DE | 100 62 690 A1 | 7/2002 |
| EP | 1129871 A1 | 9/2001 |
| JP | 2000-062461 | 2/2000 |

* cited by examiner

*Primary Examiner* — Katherine Mitchell
*Assistant Examiner* — Candace L Bradford
(74) *Attorney, Agent, or Firm* — Leydig, Voit & Mayer, Ltd.

(57) ABSTRACT

A window roller blind for motor vehicles having a guide rail arrangement that also forms an interior panel of the vehicle. The interior panel has a gap that forms a guide groove for guiding movement of the window blind between open and closed positions of the vehicle. The guide groove is undercut by being formed with a slot and a larger sized chamber behind interior panel parts. The chamber is defined either partly or completely within a rail fixed to rear sides of the interior panel parts.

9 Claims, 5 Drawing Sheets

SIDE PANEL WITH INTEGRATED WINDOW SHADE GUIDE RAIL

FIELD OF THE INVENTION

The present invention relates generally to roller blinds for motor vehicles, and more particularly, to an improved guide rail arrangement for such roller blinds.

BACKGROUND OF THE INVENTION

DE 100 57 759 A1 describes a rear roller blind for motor vehicles. This rear roller blind comprises a winding shaft that is rotatably supported underneath a rear window shelf, with one edge of a sheet-like shade being fixed on the winding shaft. The sheet-like shade is cut to an approximately trapezoidal shape at one edge and fixed to a pull-out rod at its other edge distant to the winding shaft. The pull-out rod is laterally guided in two guide rails that are either adhered to the inner side of the rear window or concealed in the car body behind the C-column panel. Elastically flexible thrust elements are guided in the guide rails in buckle-proof fashion.

The guide rails consist of an extruded aluminum profile with a continuous undercut groove. The groove is composed of a chamber of circular cross section and a groove slot that is narrower than the diameter of the chamber.

Sliding or guiding elements move in the guide rails, the sliding or guiding elements include a head, the cross section of which is adapted to the cross section of the circular chamber of the guide rail profile. This head has the shape of a ball or a short cylindrical section, dimensioned so that it cannot become jammed in the curved sections of the guide rails. The diameter of the neck also prevents the sliding elements from getting stuck in the slot of the guide groove.

The head of the guide element usually is an injection-molded plastic material.

Over time, the mating plastic guide element and aluminum rail is not rattle-free under all conditions. The friction contact between the plastic guide elements and the aluminum rail also is not optimal. In addition, certain difficulties must be overcome when installing the guide rails in the motor vehicle since the guide rails and the corresponding parts of the interior panel comprise separate components.

OBJECTS AND SUMMARY OF THE INVENTION

It is an object of the present invention to provide a novel rear roller blind that eliminates the foregoing disadvantages of the prior art.

A window roller blind or rear roller blind conventionally comprises a winding shaft for winding a sheet-like shade. A bow or pull rod is provided on the front edge of the sheet-like shade in order to pull out and hold the sheet-like shade in the tensioned state. The ends of the pull rod move in guide rails. According to the present invention, the guide rails form an integral part of the side panel, for example, of the C-column of the car body.

The C-column is located between the rear window and the rearmost side window. The interior panel on each side of the vehicle is divided into first and second parts that border on one another such that a gap is formed. A rail that covers the slot is arranged on the rear side of both panel parts in the region of the gap. Thus, after installation, a guide rail arrangement with an undercut groove for the bow is formed. The undercut groove is composed of a chamber delimited by a wall and a slot delimited by two walls. The slot opens the chamber to the outside and has a width that is smaller than the diameter of the chamber.

Since, in any case the guide groove extends in the immediate vicinity of the given window, the interior panel part located between the gap and the windowpane is very narrow. Consequently, it can be easily connected to the other, larger interior panel part by means of the rail. Another possibility entails suitably connecting or integrally producing both interior panel parts independently of the rail.

One significant advantage of this novel arrangement is that the interior panel parts can be injection-molded in the form of essentially flat structures without requiring movable cores for the injection mold in order to produce the chamber of the guide groove. Such a manufacture would be otherwise impossible because the guide groove is neither straight nor has a constant curvature. It essentially follows the contour of the car body and thus changes its radius of curvature continuously over its length. It would be impossible to extract the core from such a guide groove or to fix such a core in the mold cavity before the injection-molding process.

Smaller movable cores for producing snap-in pins or snap-in openings for fastening the interior panel parts on the car body do not significantly increase the complexity of the injection mold. Consequently, they are not an obstacle to the manufacture of the given interior panel part. This applies similarly to undercuts required for holding the rail on the rear side of the interior panel parts.

The rail of the novel window roller blind is injection-molded in the form of a separate part. According to one embodiment, the rail contains an undercut groove consisting of a chamber and a groove slot, which makes possible a rail design that it can be pulled off a rigid core that produces the chamber of the groove and is located in a mold cavity, despite the undercut. This is simply achieved by pulling the injection-molded rail off the mold core such that the mold core for the chamber is slid through the slot of the groove, with the slot widening elastically to a corresponding extent and then returning to its correct dimensions. This widening is also possible if the guide rail is curved in the longitudinal direction. Rails that are curved in three dimensions also can be produced in this fashion.

Due to the suitable relation between the width of the groove slot and the diameter of the chamber, the rail can be easily removed from the mold cavity. The removal is simplified, in particular, if the wall of the chamber transitions into the corresponding slot wall at an angle greater than 90°. During removal, forces are automatically generated that tend to widen the rail in the region of the slot such that the mold core is able to pass through the slot.

In another embodiment, the rail contains only a channel-shaped groove that is free of undercuts. Here, the wall of the chamber is defined partly by the rail and partly by the rear side of the interior panel parts. The slot walls are arranged solely on the interior panel parts and are identical section-wise with the walls of the gap that separates the two interior panel parts.

In any case, fastening means for permanently connecting the rail to the interior panel parts are provided on the rail and/or the interior panel parts. As mentioned above, the connection between the interior panel parts can be produced by means of the rail or separate connecting means, for example, bridge elements or the like that are integrally injection-molded onto the respective parts.

The interior panel parts according to the invention are designed for a window roller blind to be integrated into a motor vehicle. For this purpose, the interior panel parts are formed as described above.

Other objects and advantages of the invention will become apparent upon reading the following detailed description and upon reference to the drawings, in which:

Figure 1:
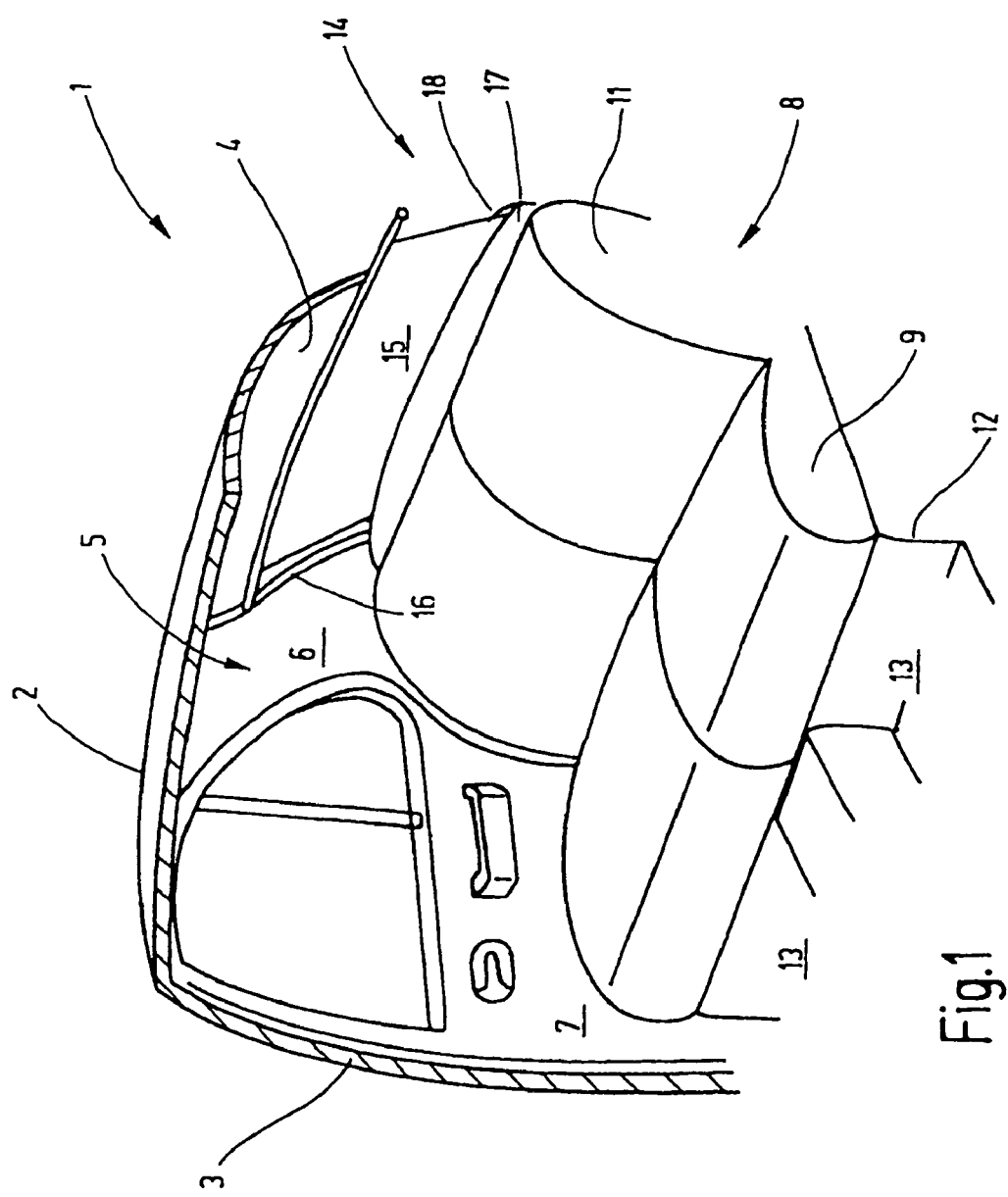
FIG. 1 is a partial perspective of a motor vehicle showing an inner side of a rear window having a window roller blind according to the invention.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to FIG. 1 of the drawings, there is shown the inside of a passenger car having a rear window roller blind in accordance with the invention The passenger car includes a body section 1 that includes a roof 2, from which a B-column 3 laterally extends downward to a floor group, not shown. The roof 2 transforms into a rear window 4 on its rear edge. The rear window 4 laterally ends on a C-column 5 that is spaced apart from the B-column 3. The C-column 5 carries the inside lining 6.

As will be understood by persons skilled in the art, between the B-column 3 and the C-column 5, a right rear door 7 is conventionally hinged to the B-column 3. A rear bench 8 consisting of a seat 9 and a back rest 11 is arranged at the height of the right rear door 7. The rear seat 9 lies on a base surface 12 that forms part of the floor group, wherein a certain leg room 13 is created in this floor group in front of the rear seat 9.

A rear window roller blind 14 is mounted on the inner side of the rear window 4. The roller blind 14 has a strip-shaped shade 15 mounted for movement between lateral guide grooves 16, being depicted in FIG. 1 in a partially extended position. The guide grooves 16 begin at a rear window shelf 17 arranged behind the back rest 11 and extend adjacent to the lateral window edge. The strip-shaped shade 15 extends out of a continuous slot 18 arranged in the rear window shelf 17.

Figure 2:
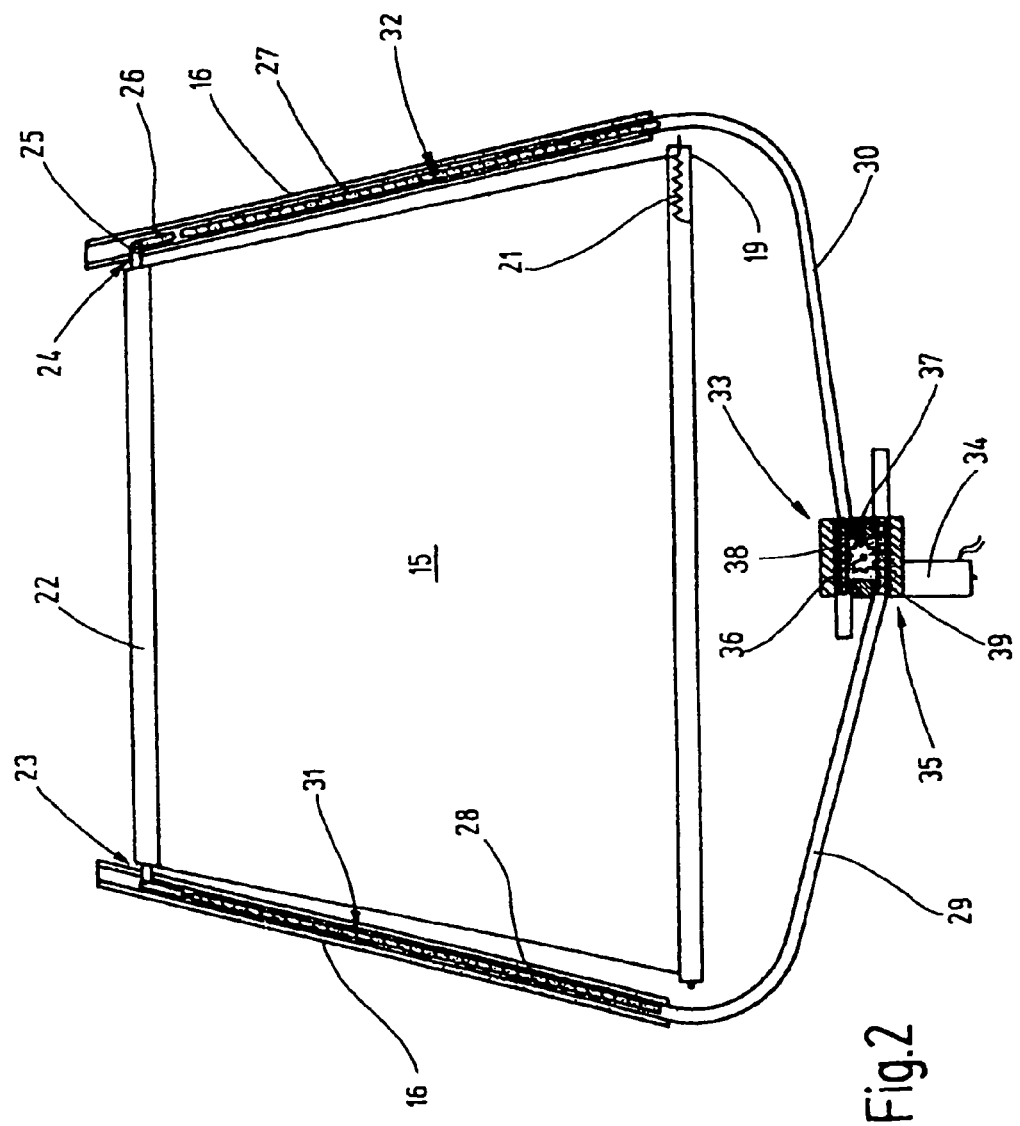
FIG. 2 is an enlarged depiction of the roller blind shown in FIG. 1.

The roller blind 14, the basic design of which is shown in FIG. 2, has a winding shaft 19 rotatably supported underneath the rear window shelf 17, with one edge of the strip-shaped shade 15 being fixed to this winding shaft. The winding shaft 19 is pre-stressed in the wind-up direction of the strip-shaped shade 15 on the winding shaft 19 with the aid of an appropriate spring drive 21. The spring drive 21 in this case is a coil spring, one end of which is rigidly anchored on the car body and the other end of which is fixed in the winding shaft 19.

The strip-shaped shade 15 has an approximately trapezoidal shape and is formed with a tubular loop 22 on an end opposite the winding shaft 19. A draw-out profile or pull rod through the tubular loop 22 and telescopically supports guide pieces 23, 24 in its interior. The guide pieces 23, 24 contain a neck part 25 of smaller diameter than an adjacent guide element 26 that has the shape of a short cylindrical section. The guide pieces 26 move in the guide grooves 16 arranged adjacent opposite lateral edges of the rear window 4.

The lower end of each guide groove 16 is connected to a guide tube 29, 30, in which two bendable thrust elements 31, 32 are guided in a buckle-proof fashion. The bendable thrust elements 31, 32 comprise so-called Suflex shafts. They include a cylindrical core that is surrounded by a helically extending rib, which defines a flexible toothed rack with peripheral gearing.

The guide tubes 29 and 30 connect the guide grooves 16 to a gear motor 33. The gear motor 33 comprises a permanently excited D.C. motor 34 which is part of a drive 35 having an output shaft 36 onto which a cylindrical gear 37 in the form of a toothed wheel is fixed. The toothed wheel 37 positively meshes with both thrust elements 31, 32. These thrust elements 31, 32 tangentially extend past the cylindrical gear 37 on diametrically opposite sides and are guided in corresponding bores 38, 39 for this purpose.

When the drive motor 33 is actuated, the thrust elements 31, 32 are selectively extended or retracted, with the guide pieces 23, 24 following the movement of the thrust elements 31, 32. These guide pieces are held against the free ends of the thrust elements 31, 32 in the guide grooves 27 with the aid of a spring 21.

Figure 3:
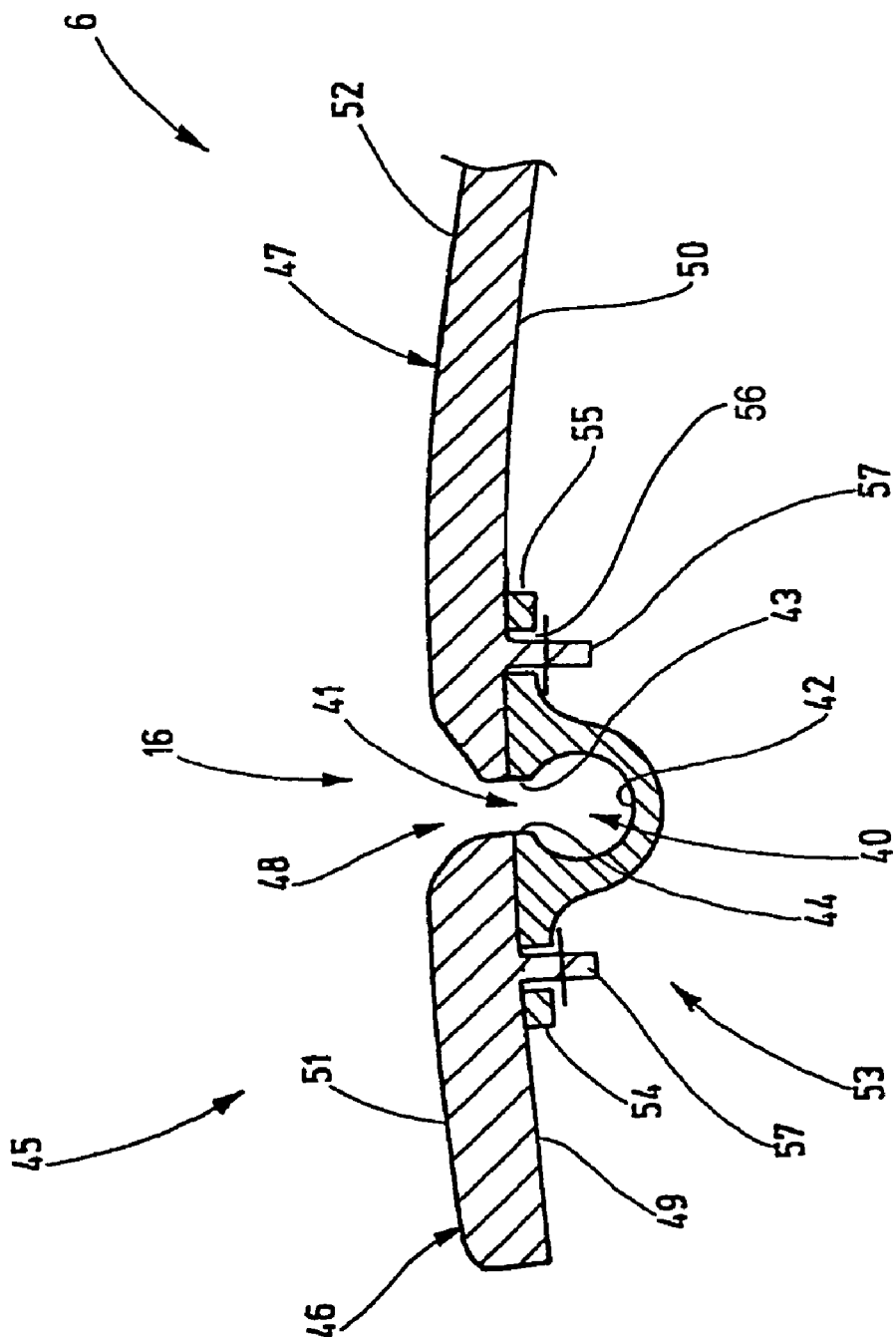
FIG. 3 is an enlarged transverse section of a roller blind guide arrangement according to the invention, taken transversely to a longitudinal axis of a guide groove therein.

In accordance with the invention, the guide grooves 16 can be configured as undercut guide grooves 16 defined by the interior panel parts 6 of the motor vehicle. In the illustrated embodiment, as depicted in FIG. 3, each undercut guide groove 16 consists of a chamber 40 that has a circular cross section and is opened toward the outside by means of a groove slot 41. The chamber 40 is delimited by a chamber wall 42 that transitions into slot walls 43, 44 in the vicinity of the groove slot 41. The slot walls 43, 44 extend parallel to one another in the longitudinal direction of the undercut groove 16 and are separated from one another by a distance that is smaller than the diameter of the chamber 40 such that an undercut is formed. As depicted in FIG. 3, the wall 42 of the chamber 40 transitions into the slot walls 43, 44 at an angle that is greater than 90°. It can be seen that the guide elements 23, 24 with the neck part 25 are adapted for interfitting relation with the undercut guide groove 16.

As further depicted in FIG. 3, the guide groove 16 forms part of a guide rail arrangement 45 that also comprises the interior panel 6. The interior panel 6 in this case is composed of two interior panel parts 46, 47 that border one another in the vicinity of a gap 48. In the embodiment shown in FIG. 3, the gap 48 simultaneously forms an outer panel part, i.e., a part that faces the interior of the motor vehicle. Each lateral panel part 46, 47 has a respective rear sides 49, 50, as well as respective front or visible sides 51, 52.

The interior panel parts 46, 47 are fastened to the body shell of the vehicle at their rear sides 49, 50. Appropriate snap-in tabs, snap-in openings, hooks or hook-shaped pins are provided for this purpose. In any case, the rear sides 49, 50 are essentially free of large-volume undercuts that would require complicated movable slides or cores in an injection mold in which they are produced. The visible sides 51, 52 are designed in accordance with the rest of the interior panel, for example, covered with a felt-like material.

During manufacture, the two interior panel parts 46, 47 can initially be completely separate. They are joined to one another during the course of the installation, for example, directly on the inside of the roof. In the lower region of the gap 48, the interior panel parts may be fixed to one another by means of a web or a bridge before they are ultimately anchored to the car body. Although this connection is not imperative, it serves to simplify the installation.

The interior panel part 46 has an essentially strip-shaped, narrow design and lies between the guide groove 16 and the adjacent edge of the rear window in the finished motor vehicle. The interior panel part 47, in contrast, has a much larger surface because it fills out the region between the guide groove 16 and the adjacent door cutout.

The illustrated guide rail arrangement 45 not only comprises the two interior panel parts 46, 47, but also a profiled rail 53 that is located on the rear sides 49, 50 of both interior panel parts 46, 47 and bridges the gap 48. The rail 53 defines the part of the guide groove 16 that, when viewed from the visible sides 51, 52, lies behind the two interior panel parts 46, 47. The rail 53 thereby defines the entire chamber 40 and the section of both slot walls 43, 44 that extends up to the rear sides 49, 50 of the interior panel parts 46, 47. The remainder of the slot walls 43, 44 simultaneously forms the wall of the gap 48.

Lateral flange-type strips 54, 55 are integrally formed on the rail 53 and make it possible for the rail 53 to flatly and snugly adjoin the rear sides 49, 50 of the panel parts 46, 47. In order to connect the rail 53 to the two interior panel parts 46, 47, cylindrical bores are provided in the flange-like piece which receive pins 57 arranged on the rear sides 49, 50 of the panel parts. The pins 57 pass through the bores 56 and project to the rear side. Disk-shaped ball clips can be attached on the protruding pin sections and serve to press the rail 53 against the rear sides 49, 50 with a certain amount of tension.

Since the rail 53 not only defines the chamber 40, but also parts of the slot walls 43, 44, it contains an undercut groove whose length corresponds to the length of the guide groove 16. It also would be possible to manufacture such a piece 53 in an injection mold without a drawable core for the chamber 40 and to remove said piece from the injection mold, as indicated in FIG. 4.

Figure 4:
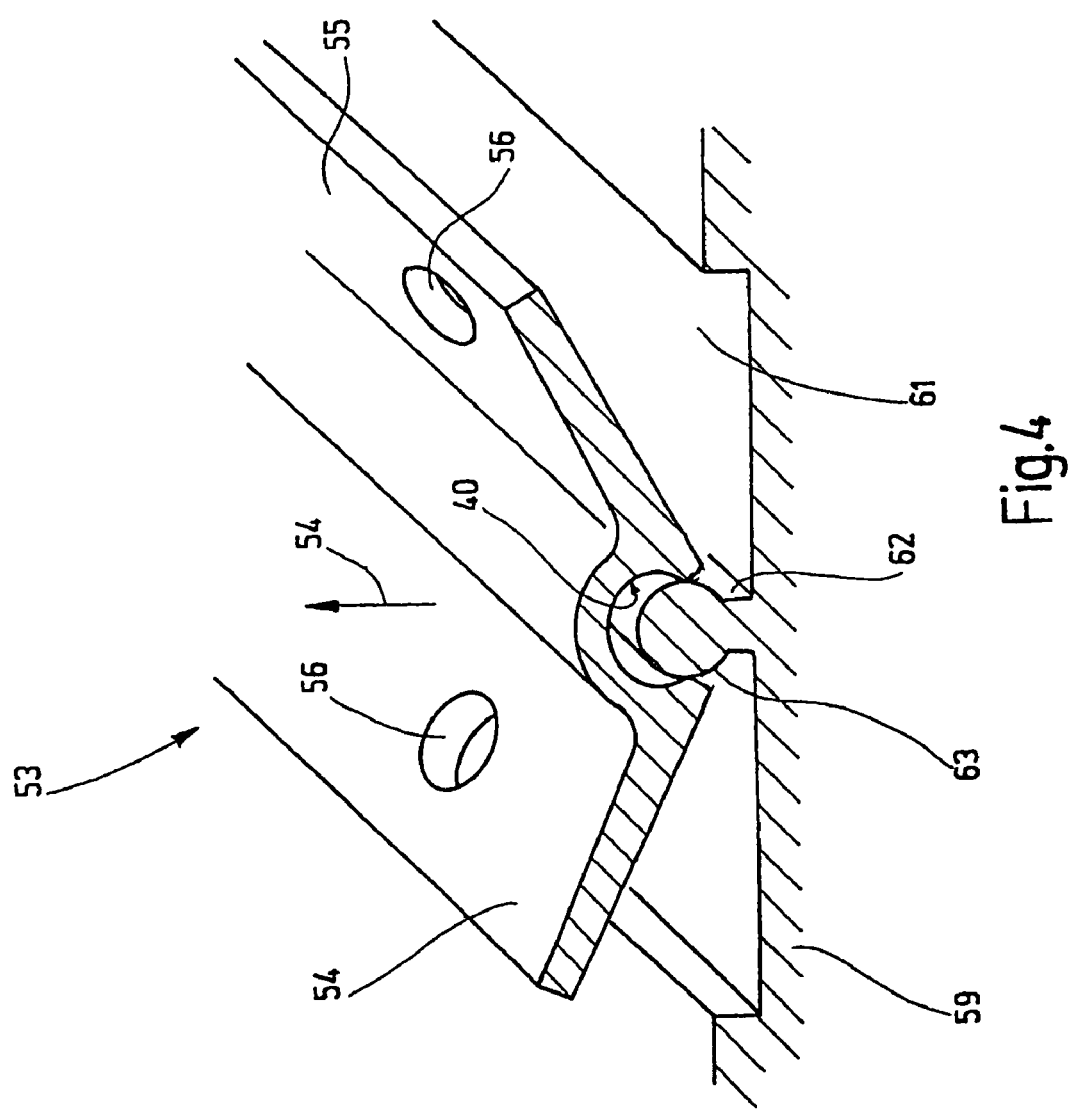
FIG. 4 is a transverse section depicting removal of a guide rail of the guide arrangement from an injection mold in which it is formed.

As schematically depicted in FIG. 4, a lower mold cavity section 59 is shown that contains a groove 61. A web 62 projects upwardly approximately at the center of the groove 61 which carries a circular thickening or bead 63 on its upper free end. During an injection-molding process, the web 62 forms the parts of the slot 41 contained in the rail 53, while the thickening 63 forms the chamber 40. If the relation between the width of the groove slot 41 and the diameter of the chamber 40, as well as the corresponding material thickness of the rail 53 at the positions located opposite the groove slot 41 are suitably chosen, it is possible to pull the rail 53 off the mold core in the direction of the arrow 54, where the mold core is composed of the web 62 and the thickening 63 as shown. During such removal, the rail 53 elastically spreads apart in the region of the slot and generally returns into its original shape after removal. This makes it possible to produce guide rail arrangements 45 with complex three-dimensional shapes. In addition, it is possible to integrate the guide rail arrangement into the interior panel such that separate guide rails, as are otherwise required in the prior art, are eliminated.

Figure 5:
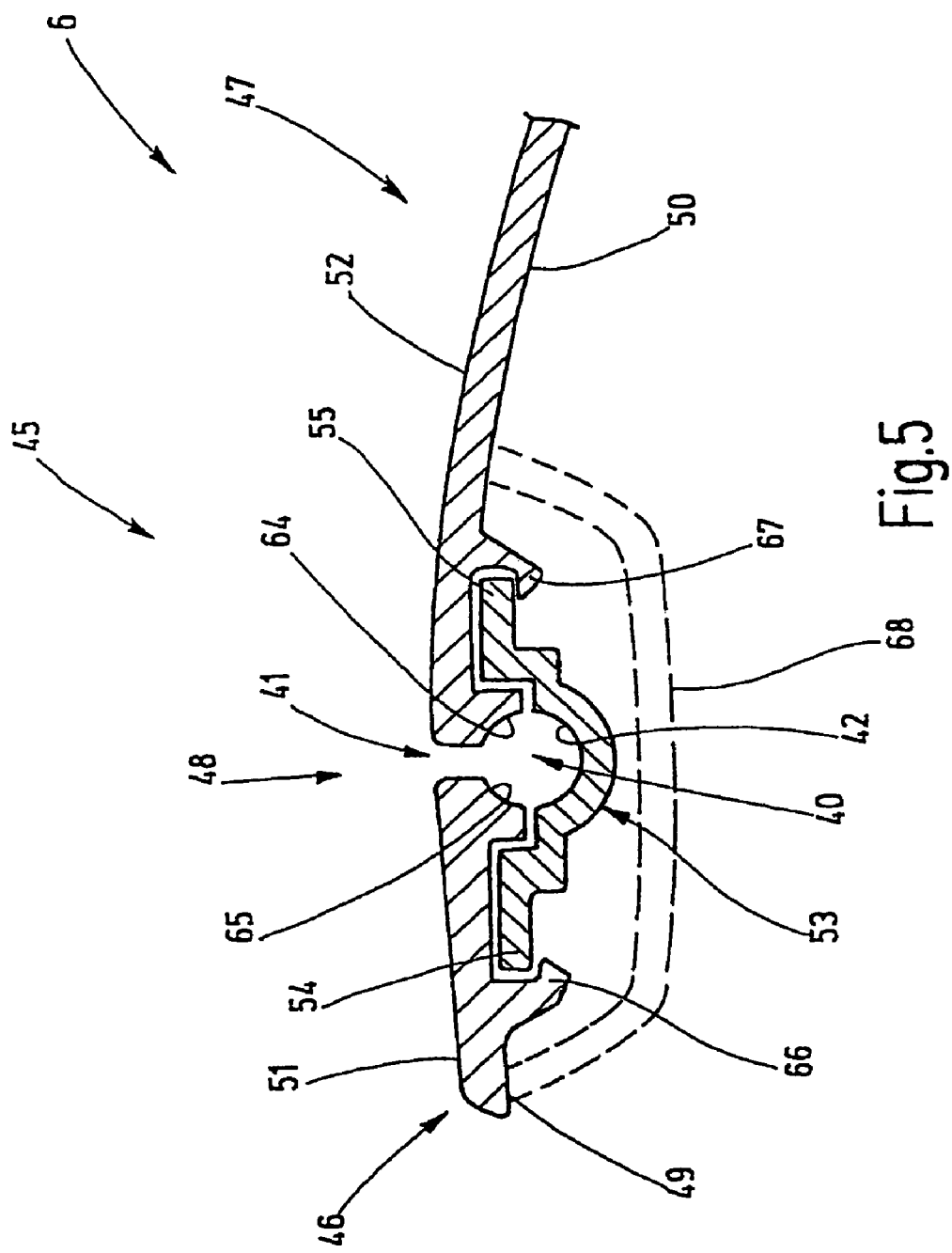
FIG. 5 is a transverse section of an alternative embodiment of guide rail arrangement in accordance with the invention.

The alternative embodiment according to FIG. 5 can be used in the event material consistency and/or dimensions do not permit removal of the part from the mold in the manner shown in FIG. 4. In this embodiment, structural elements with identical or similar function are identified by the same reference symbols as in the preceding figures.

In the embodiment according to FIG. 5, the rail 53 defines only a semicylindrical section of the chamber 40, i.e., the section that lies directly opposite the slot 41. Thus, the rail 53 is completely free of undercuts. The injection mold is significantly simplified in this case because the section of the chamber 40 contained in the rail 53 essentially has the form of a semicircular channel.

The remainder of the wall 42 of the chamber 40 is partly defined by respective sections 64, 65 in the region of the rear side 49 or 50 of the two interior panel parts 46, 47. In the installed condition, the wall sections 64, 65 and the channel in the rail 53 form the chamber 40 with the previously described circular cross section. The wall sections 64, 65 in this instance are exclusively defined by the two interior panel parts 46, 47 such that the groove slot 41 at the same time forms the gap 48 at which the two interior panel parts 46 and 47 line opposite one another.

In order to mount the rail 53, catches 66, 67 engage over the flange-like pieces 54, 55, as shown in FIG. 5 on the respective rear sides 49, 50. A bridge 68 as schematically depicted in FIG. 5 serves to connect the two interior panel parts 46, 47 in the region of the lower end of the gap 48 sufficiently rigidly for simplifying the mounting on the car body.

From the foregoing, it can be seen that a window shade for motor vehicles is provided that contains a guide rail arrangement that also comprises the interior panel. The interior panel defines a gap that at the same time forms a groove slot of a guide groove. The guide groove is undercut and comprises the necessary guide slot as well as a chamber formed behind the interior panel parts. Depending on the respective embodiment, the chamber located partly or completely within a rail that is mounted to the rear side of the two interior panel parts.

What is claimed is:
1. A motor vehicle comprising:
 a frame which includes interior structural columns and a plurality of windows,
 a roller blind associated with at least one of said windows, said roller blind including a rotatably supported window shade shaft for mounting adjacent said one window;
 a shade having one edge fixed to the window shade shaft and another edge distant from the window shade shaft;
 a pull rod that is connected to the shade on the edge that lies distant from the window shade shaft;
 a plurality of separate interior parts that form a guide rail arrangement with an undercut guide groove for receiving and guiding movement of the pull rod of the window blind;
 said plurality of interior parts including a first discrete individual interior lining panel part having a visible side facing an interior of the vehicle and a rear side facing and for being secured to an interior structural column of the motor vehicle;
 a second discrete individual interior lining panel part separate from and not integrally connected to the first interior lining panel part having a visible side facing the interior of the vehicle and a rear side facing in a direction toward an interior structural column of the motor vehicle;
 said interior lining panel parts covering the interior structural column of the motor vehicle and rigidly bordering each other in a manner that respective edges of the lining panel part forms a fixed, constant width gap between the panel parts along a distance between said shade opening and closing positions for guiding movement of a respective end of the pull rod along a path of travel defined by the gap;
 a rail arranged on the rear sides of the said interior individual lining panel parts and extending along and over the fixed gap therebetween;

said guide rail arrangement forming an undercut groove for receiving an end of the window shade pull rod and guiding movement thereof, said undercut groove including a chamber defined by at least one wall of the guide rail arrangement and a slot narrower in width than said chamber and communicating outwardly thereof defined by at least two walls of said guide rail arrangement.

2. The motor vehicle of claim 1 in which said interior lining panel parts of the guide rail arrangement are mounted on and form an interior panel that covers of a column located adjacent a rear window of the motor vehicle.

3. The motor vehicle of claim 1 in which said rail is formed with an undercut groove that defines said chamber and walls that define at least part of said slot.

4. The motor vehicle of claim 1 in which said rail is injection molded with walls that define said chamber and at least part of said slot, said walls and chamber being designed such that the rail can be removed from a core of an injection-molding machine after an injection molding process with the core being released from the chamber through the slot.

5. The motor vehicle of claim 1 in which said rail is injection molded and is formed with a wall that defines at least part of said chamber designed such that the rail may be removed from a core of an injection-molding machine after the injection-molding process with the core being released from the chamber during removal.

6. The motor vehicle of claim 1 in which at least one wall that defines said chamber transcends into walls that define the slot at an angle greater than 90°.

7. The motor vehicle of claim 1 in which said rail includes fastening elements opposite the slot for mounting the rail on the rear side of the interior panel parts.

8. The motor vehicle of claim 1 in which said rail defines a groove-free of undercuts.

9. The motor vehicle of claim 1 in which said rail is formed with a wall that defines only part of said chamber, and said interior lining panel parts have walls that define a remainder of the chamber.

\* \* \* \* \*